(12) United States Patent
Katchmart

(10) Patent No.: US 11,430,481 B2
(45) Date of Patent: Aug. 30, 2022

(54) DUAL-SURFACE SELF-SERVO-WRITE FOR STORAGE DEVICE

(71) Applicant: Marvell Asia Pte, Ltd., Singapore (SG)

(72) Inventor: Supaket Katchmart, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/447,209

(22) Filed: Sep. 9, 2021

(65) Prior Publication Data

US 2022/0076703 A1    Mar. 10, 2022

Related U.S. Application Data

(60) Provisional application No. 63/076,272, filed on Sep. 9, 2020.

(51) Int. Cl.
*G11B 5/54*     (2006.01)
*G11B 21/08*    (2006.01)
*G11B 5/012*    (2006.01)

(52) U.S. Cl.
CPC ............ *G11B 21/083* (2013.01); *G11B 5/012* (2013.01)

(58) Field of Classification Search
CPC ... G11B 5/59666; G11B 5/596; G11B 5/5521; G11B 5/29; G11B 5/59627; G11B 5/59688; G11B 11/10578; G11B 5/59672; G11B 5/59683; G11B 5/54; G11B 27/36
USPC .......................................... 360/75
See application file for complete search history.

(56) References Cited

U.S. PATENT DOCUMENTS

| | | | |
|---|---|---|---|
| 8,027,117 B1 | 9/2011 | Sutardja et al. | |
| 10,276,198 B1 * | 4/2019 | Katchmart | ........ G11B 11/10578 |
| 10,971,187 B2 | 4/2021 | Katchmart | |
| 2019/0279675 A1 * | 9/2019 | Schmidt | ............... G11B 5/5965 |

* cited by examiner

*Primary Examiner* — Nabil Z Hindi

(57) ABSTRACT

A self-servo-write (SSW) method in a storage device includes detecting, with a first read head, SSW spiral signals from a first track on a first storage medium surface, processing the SSW spiral signals from the first track using a first read channel, to generate first control signals for positioning the first read head relative to the first track, detecting, with a second read head, SSW spiral signals from a second track on a second storage medium surface, processing the SSW spiral signals from the second track using a second read channel, to generate second control signals for positioning the second read head relative to the second track, positioning a first write head relative to the first track using the first control signals via a single write channel, and positioning a second write head relative to the second track using the second control signals via the single write channel.

18 Claims, 7 Drawing Sheets

DUAL-SURFACE SELF-SERVO-WRITE FOR STORAGE DEVICE

CROSS REFERENCE TO RELATED APPLICATIONS

This disclosure claims the benefit of U.S. Provisional Patent Application No. 63/076,272, filed Sep. 9, 2020, which is hereby incorporated by reference herein in its entirety.

FIELD OF USE

This disclosure relates to self-servo-write operations in storage devices such as disk drives. More particularly, this disclosure relates to performing self-servo-write operations concurrently on two surfaces of a multi-surface storage device.

BACKGROUND

The background description provided herein is for the purpose of generally presenting the context of the disclosure. Work of the inventors hereof, to the extent that that work is described in this background section, as well as aspects of the description that may not otherwise qualify as prior art at the time of filing, are neither expressly nor impliedly admitted to be prior art against the subject matter of the present disclosure.

In magnetic recording, as one example, reading and writing are performed by one or more heads that move relative to the surface of a storage medium. Magnetic disk drives, for example, include a one or more individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter. Each arm may include, at the end of the arm (remote from the common actuator) that bears the heads, one or more articulated portions referred to as "micro-actuators". If there is more than one micro-actuator, the micro-actuator furthest from the common actuator bears the heads.

In order to control the radial position selected by the actuator, each surface of each platter has distributed upon it positional information referred to as "servo" data. The servo data are commonly distributed in spaced-apart servo "wedges" (generally spaced equiangularly) on the platter surface. By reading the servo data as each servo wedge passes under the read head, the disk drive controller can determine the precise radial (and angular) position of the head and can feed back that determination to control the position of the read head or the write head, depending on the required operation.

Servo wedge information typically is recorded on a storage medium at the time of manufacture. One technique for recording servo wedge information is "self-servo write" ("SSW"), in which the storage device's own read/write mechanisms, including data channel controllers and read/write heads, are used to write the servo wedge information, possibly under control of an external processor.

Self-servo-write operations typically begin with writing of initial or "coarse" reference spirals. The coarse reference spirals are sets of time data written in highly ramped spirals between the outer and inner diameter of the disk by sweeping the disk read/write head radially at a relatively high rate as the disk rotates. The coarse reference spirals may not be regularly or evenly spaced. After coarse reference spirals have been written, the read/write mechanism reads and "learns" the locations of the coarse reference spirals. The coarse reference spiral locations are then referenced to allow the writing of more refined location data as "intermediate" reference spirals. The intermediate reference spirals are less ramped than the coarse spirals and contain more precise time data. After the intermediate spirals have been written, the read/write mechanism reads and "learns" the locations of the intermediate spirals. From this finer location data, the read/write mechanism writes final servo control signal patterns as "servo wedges" along concentric arcs at varying radii (i.e., in tracks).

As described, self-servo-write operations utilize both the read-data channel (RDC) and the write-data channel (WDC) of a disk drive, and both the RDC and the WDC are typically limited to operating on only one disk surface at any one time. In a typical disk drive having multiple platters, each with hundreds of thousands of tracks, but only one RDC and one WDC, self-servo-write operations that are performed during manufacturing of the disk drive may require days or weeks to complete, adding to the time and cost of manufacturing the disk drive. Indeed, up to 40% of the time required to manufacture a high-performance disk drive is consumed by the self-servo-write process.

SUMMARY

According to implementations of the subject matter of this disclosure, a self-servo-write method in a storage device includes detecting, with a first read head of the storage device, self-servo-write spiral signals from a first track on a first storage medium surface of the storage device, processing the self-servo-write spiral signals from the first track using a first read channel of the storage device, to generate first control signals for positioning the first read head relative to the first track, detecting, with a second read head of the storage device, self-servo-write spiral signals from a second track on a second storage medium surface of the storage device, processing the self-servo-write spiral signals from the second track using a second read channel of the storage device, to generate second control signals for positioning the second read head relative to the second track, positioning a first write head relative to the first track using the first control signals via a single write channel of the storage device, and positioning a second write head relative to the second track using the second control signals via the single write channel of the storage device.

A first implementation of such a method may further include determining, from positions of a respective one of the first read head and the second read head during successive passes over a location on a respective one of the first storage medium surface and the second storage medium surface, a phase differential between data written by a respective one of the first write head and the second write head during a first one of the successive passes, and data written by the respective one of the first write head and the second write head during a second one of the successive passes, using the phase differential to adjust servo wedge data for the second one of the successive passes relative to servo wedge data for the first one of the successive passes, and writing the adjusted servo wedge data for the first track to the first track, and writing the adjusted servo wedge data for the second track to the second track, using the single write data channel of the storage device.

A first aspect of that first implementation may further include adjusting timing of at least one of the writing of the servo wedge data for the first track to the first track, and the writing of the servo wedge data for the second track to the second track, to compensate for the phase differential.

In a second aspect of that first implementation, writing the servo wedge data for the first track to the first track, and writing the servo wedge data for the second track to the second track, using the single write data channel of the storage device, may include presenting a write data signal including the servo wedge data for the first track, and the servo wedge data for the second track, to both a write head for the first track and a write head for the second track, and toggling a write select signal to write servo wedge data in the write data signal to a correct one of the first track and the second track.

In one instance of that second aspect, the toggling may be performed to compensate for the phase differential.

A second implementation of such a method may further include processing the self-servo-write spiral signals from the first track to generate frequency control signals to adjust rotational velocity of storage media of the storage device.

In a third implementation of such a method, positioning the first read head relative to the first track, and positioning the second read head relative to the second track, may include rotating a common actuator of a first arm carrying the first read head and a second arm carrying the second read head.

According to a first aspect of that third implementation, positioning the first read head relative to the first track, and positioning the second read head relative to the second track, may further include adjusting a micro-actuator on at least one of the first arm and the second arm.

According to a first instance of that first aspect, adjusting a micro-actuator on at least one of the first arm and the second arm may include independently adjusting a first micro-actuator on the first arm and a second micro-actuator on the second arm.

A storage device according to implementations of the subject matter of this disclosure includes a storage medium, having multiple storage medium surfaces, on which servo data is written using a self-servo-write method, a first read head configured to detect self-servo-write spiral signals from a first track on a first storage medium surface of the storage device, a first write head corresponding to the first read head, and configured to write self-servo-write data to the first track, a second read head configured to detect self-servo-write spiral signals from a second track on a second storage medium surface of the storage device, a second write head corresponding to the second read head, and configured to write self-servo-write data to the second track, first read data channel circuitry configured to process the self-servo-write spiral signals from the first track, to generate first control signals for positioning the first read head and the first write head relative to the first track, second read data channel circuitry configured to process the self-servo-write spiral signals from the second track, to generate second control signals for positioning the second read head relative to the second track, and actuator control circuitry that is responsive to the first control signals and configured to control positioning of the first write head relative to the first track, and responsive to the second control signals and configured to control positioning of the second write head relative to the second track.

A first implementation of such a storage device may further include channel delta control circuitry configured to determine, from positions of a respective one of the first read head and the second read head during successive passes over a location on a respective one of the first storage medium surface and the second storage medium surface, a phase differential between data written by the respective one of the first read head and the second read head during a first one of the successive passes, and data written by the respective one of the first read head and the second read head during a second one of the successive passes, wherein the actuator control circuitry is configured to use the phase differential to adjust servo wedge data for the second one of the successive passes relative to servo wedge data for the first one of the successive passes, and a single write data channel configured to write the servo wedge data for the first track to the first track, and to write the servo wedge data for the second track to the second track.

According to a first aspect of that first implementation, the single write data channel may further be configured to adjust timing of at least one of the writing of the servo wedge data for the first track to the first track, and the writing of the servo wedge data for the second track to the second track, to compensate for the phase differential.

According to a second aspect of that first implementation, the single write data channel may be configured to write the servo wedge data for the first track to the first track, and to write the servo wedge data for the second track to the second track, by presenting a write data signal including the servo wedge data for the first track, and the servo wedge data for the second track, to both a write head for the first track and a write head for the second track and by toggling a write select signal to write servo wedge data in the write data signal to a correct one of the first track and the second track.

According to an instance of that second aspect, the single write data channel is configured to perform the toggling to compensate for the phase differential.

A second implementation of such a storage device may further include disk lock control circuitry configured to process the self-servo-write spiral signals from the first track to generate frequency control signals to adjust rotational velocity of storage media of the storage device.

A third implementation of such a storage device may further include a common actuator configured to position a first arm carrying the first read head relative to the first track, and to position a second arm carrying the second read head relative to the second track.

According to a first aspect of that third implementation, the common actuator may be configured to rotate to position the first arm and the second arm.

A second aspect of that third implementation may further include a micro-actuator on at least one of the first arm and the second arm for positioning at least one of the first read head relative to the first track, and the second read head relative to the second track.

In a first instance of that second aspect, the micro-actuator on at least one of the first arm and the second arm may include a first micro-actuator on the first arm and a second micro-actuator on the second arm.

In a second instance of that second aspect, one of the first arm and the second arm may be adjacent two different storage medium surfaces, and the one of the first arm and the second arm may include one micro-actuator carrying a head for one of the two different storage medium surfaces, and another micro-actuator carrying a head for another of the two different storage medium surfaces.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
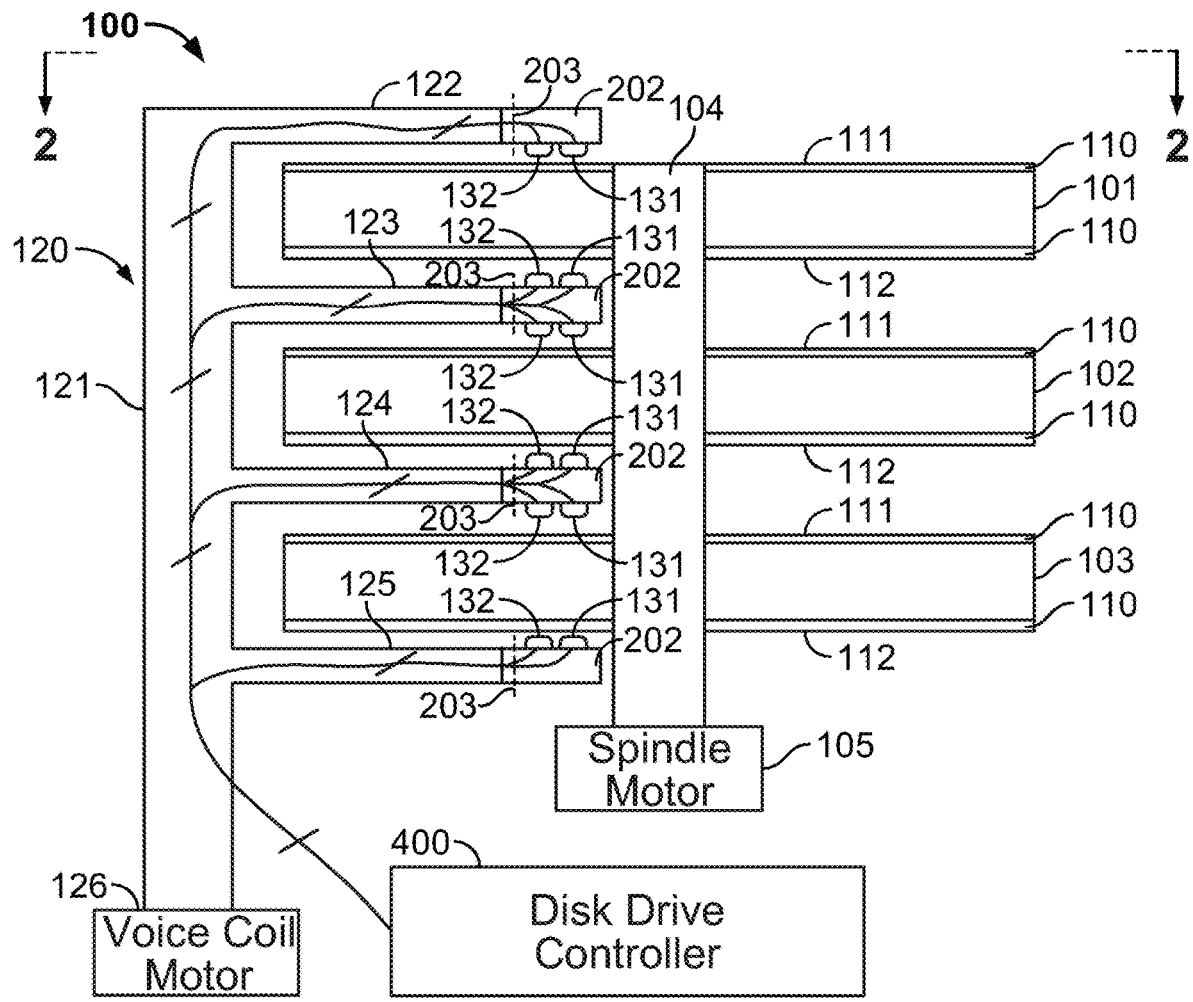
FIGS. 1 and 2 show a disk drive as an example of a storage device which may incorporate the subject matter of this disclosure.

As noted above, self-servo-write operations utilize both the read-data channel (RDC) and the write-data channel (WDC) of a disk drive, and both the RDC and the WDC are typically limited to operating on only one disk surface at any one time. A typical disk drive has multiple two-sided platters, each with hundreds of thousands of tracks (e.g., 200,000-400,000 tracks), but only one RDC and one WDC. In such disk drives, self-servo-write operations may require days or weeks to complete, adding to the time and cost of manufacturing the disk drive.

The time required to complete self-servo-write operations can be reduced by increasing the number of RDCs and WDCs in the disk drive. However, adding an RDC or a WDC is expensive. Nevertheless, recently disk drives have been developed that use two-dimensional magnetic recording (TDMR), and those disk drives include a second RDC (but only one WDC).

Therefore, in accordance with implementations of the subject matter of this disclosure, the time required to complete self-servo-write operations can be nearly halved for disk drives equipped for TDMR, by using both RDCs so that self-servo write operations can be carried out concurrently on two different disk surfaces (which can be two sides of the same disk platter, or surfaces on two different disk platters).

Although all of the read/write arms carrying the read/write heads of a disk drive assembly may be mounted on a single actuator and therefore theoretically move together to the same location over every disk platter surface, in practice vibrations and inertial forces may cause different ones of the read/write arms to move to slightly different locations. However, some disk drives have, in addition to two RDCs, micro-actuators at the end of each read/write arm. That is, in addition to each read/write arm pivoting about a main pivot point defined by the aforementioned actuator, each read/write arm should be articulated near its tip, so that the tip can be rotated about a second pivot point to fine-tune the location of the heads, and in some cases, each read/write arm may have three or more stages—i.e., at least three pivot points (including the common actuator and two micro-actuators). In accordance with implementations of the subject matter of this disclosure, self-servo-write may be implemented, in accordance with implementations of the subject matter of this disclosure, on two surfaces of a disk drive equipped with at least one micro-actuator per arm.

In implementations of the subject matter of this disclosure, the read head on one arm is locked to the servo spiral signal of a track on its corresponding surface, which may be considered to be the "primary" surface for the self-servo-write operation. On a second surface on which the self-servo-write operation is to be carried out concurrently, the micro-actuator of the arm for that surface is used to move the head, if necessary, radially so that it too may be locked to the servo spiral signal of its respective track. With the heads on both surfaces aligned to their respective tracks, the self-servo-write pattern generator can be used to write the self-servo-write pattern to each respective track on each respective surface.

However, because the micro-actuator motion is rotational, it includes not only a radial or cross-track component of motion for positioning the head properly over the track, but also a circumferential or angular component that moves the head in a down-track direction (i.e., along the track). If more than one pass is needed to write servo data to a particular track of a particular servo wedge, it is possible that the micro-actuator will be positioned differently during the two different passes to keep the head on-track. The result may be that on the two (or more) different passes, the head may be in slightly different down-track positions and a phase differential may arise between the segments of the self-servo-write pattern that are written during the different passes. Accordingly, it is further within the subject matter of this disclosure to keep track of the amount of rotation of the respective micro-actuator on each of the two arms involved in self-servo-writing, so that the amount of down-track differential can be computed and appropriate compensation can be applied.

Although the micro-actuators on both arms involved in self-servo-writing of a particular pair of surfaces may be adjusted, in a simplification in some implementations of the subject matter of this disclosure, one arm may be kept straight (i.e., the centerline of the micro-actuator is maintained in alignment with the centerline of the main arm), with the micro-actuator on only the other arm being used to adjust the cross-track position of the corresponding head. Nevertheless, for any particular servo wedge on a particular track, the micro-actuator may be in different positions on different passes.

As noted above, storage devices incorporating implementations of the subject matter of this disclosure may have only a single WDC to write the servo data. Therefore, in accordance with implementations of the subject matter of this disclosure, the writing of servo data to the two different surfaces may be accomplished by toggling the WDC between writing to a first surface and writing to a second surface, as described below. Because each servo wedge is a short burst of data that is written at a comparatively long, fixed interval, the duration of the period during which the WDC is actively writing servo data is substantially shorter than the time the needed for the disk to rotate to the next servo wedge position. Therefore, the toggling of the WDC allows writing of the servo pattern onto two surfaces in a single pass without slowing down the operation of the storage device.

The subject matter of this disclosure may be better understood by reference to FIGS. 1-9.

Figure 2:
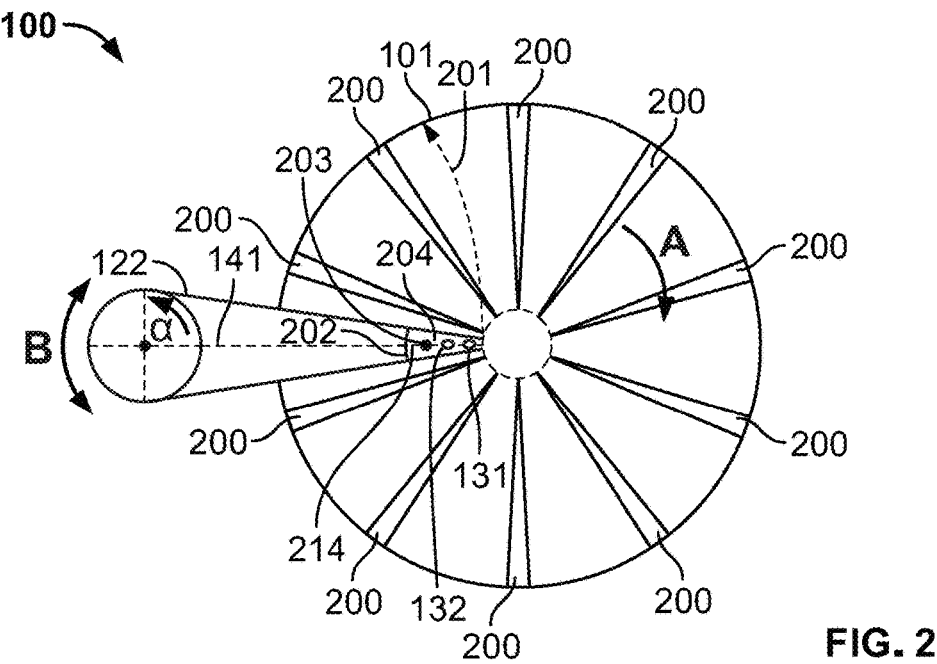

FIGS. 1 and 2 show a disk drive 100 as an example of a storage device with which the subject matter of the present disclosure may be used. In this particular example, disk drive 100 has three platters 101, 102, 103, although any number of platters may be included in a disk drive with which the subject matter of the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Motor 105 rotates spindle 104 to rotate platters 101-103 in the direction of arrow A (FIG. 2). Although motor 105 is shown connected directly to spindle 104, in some cases motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and may represent, respectively, read and write sensors, although in some applications each arm 123, 124 may bear more than one read head/sensor and more than one write head (not shown). In the configuration shown in FIGS. 1 and 2, arms 122-125 are aligned along a radius of platters 101-103, bringing heads 131, 132 as close as they can get to spindle 104. It is noted that FIGS. 1 and 2 are schematic only and not to scale. Normally, for example, the spindle diameter would be larger relative to the disk diameter. Moreover, arms 122-125 normally cannot point directly at the center of the disk.

A motor 126, commonly referred to as a "voice-coil motor," rotates actuator 121 back and forth along the directions of arrow B (FIG. 2) to move the heads 131, 132 along the path indicated by dashed arrow 201. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

The location on surface 111 of platter 101 (the other surfaces are similar) of the aforementioned wedges is shown in FIG. 2. Each servo wedge 200 includes data identifying it by wedge index, track index, or sector number (to give an angular, tangential or circumferential position) and by data representing, at each point along a radius of the platter, the distance from spindle 104.

The tip of each arm 122-125 may include a micro-actuator 202 (FIG. 2). That is, in addition to the pivot point of actuator 121, a second pivot point 203 may allow the tip 204 of arm 122-125 to be rotated relative to arm 122-125 so that the centerline 214 of tip 204 is no longer collinear with the centerline 141 of the arm 122-125. A motor (not shown) similar to voice-coil motor 126 may control the micro-actuator rotation. The size of micro-actuator 202 is exaggerated in FIG. 2. Normally, micro-actuator 202 will be proportionally much smaller than the main body of arm 122-125. As noted above, in some implementations, any one or more of arms 122-125 may include a third actuator segment (not shown).

Figure 3:
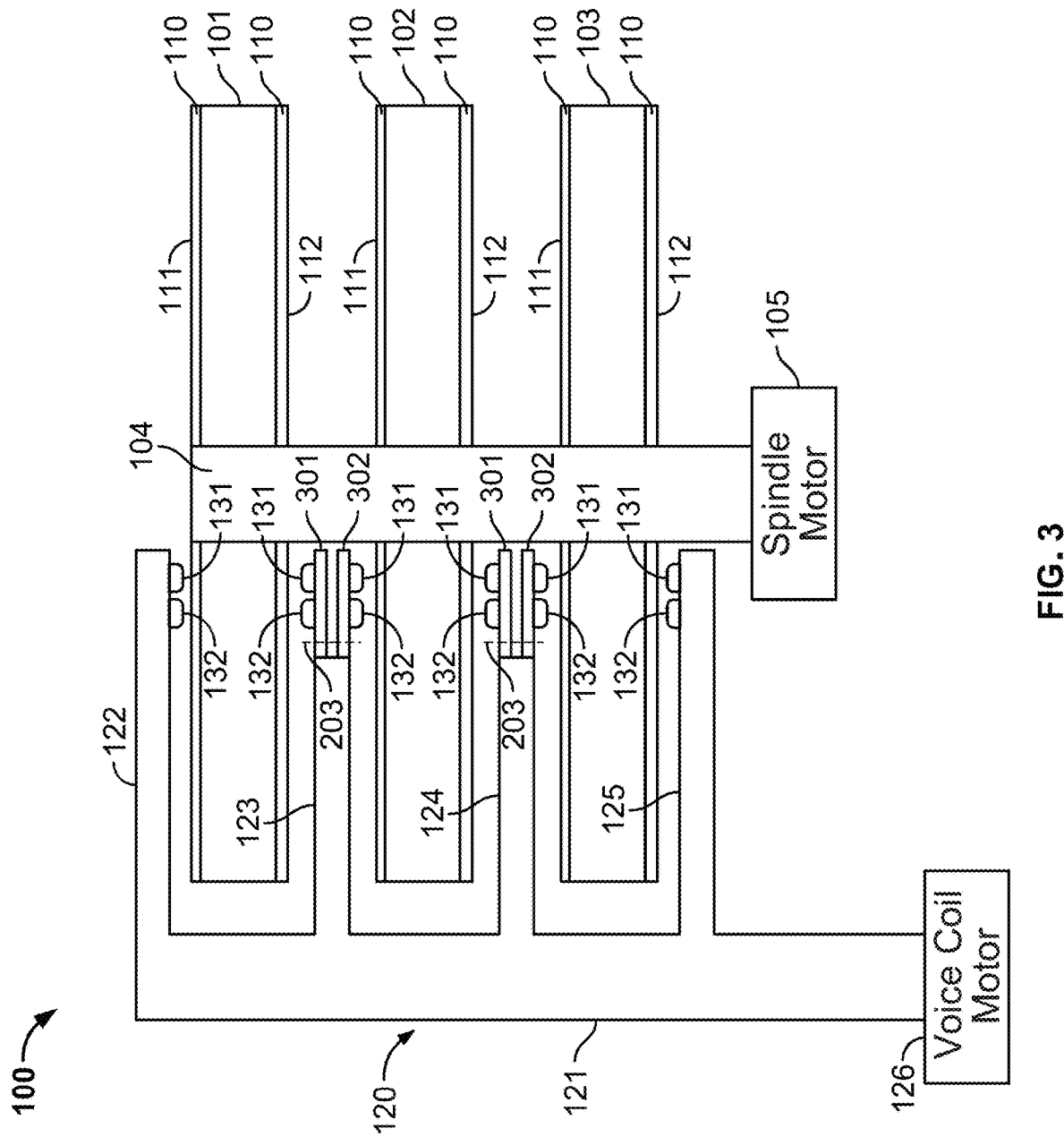
FIG. 3 is a view similar to FIG. 1 showing a disk drive having arms with two micro-actuators.

If a particular one of arms 122-125 is between two disk platters and has heads on its upper and lower surface for reading from and writing to the respective lower and upper surfaces of two different platters, there may be two separate micro actuators 301, 302 as shown in FIG. 3 (disk drive controller 400 is omitted from FIG. 3 to avoid cluttering the drawing). Again, the sizes of micro-actuators 301, 302 are exaggerated relative to the main bodies of the respective arms 122-125. Because each of micro-actuators 301, 302 controls the position of a respective head on a different respective surface, micro-actuators 301, 302 are controlled independently of each other.

Figure 4:
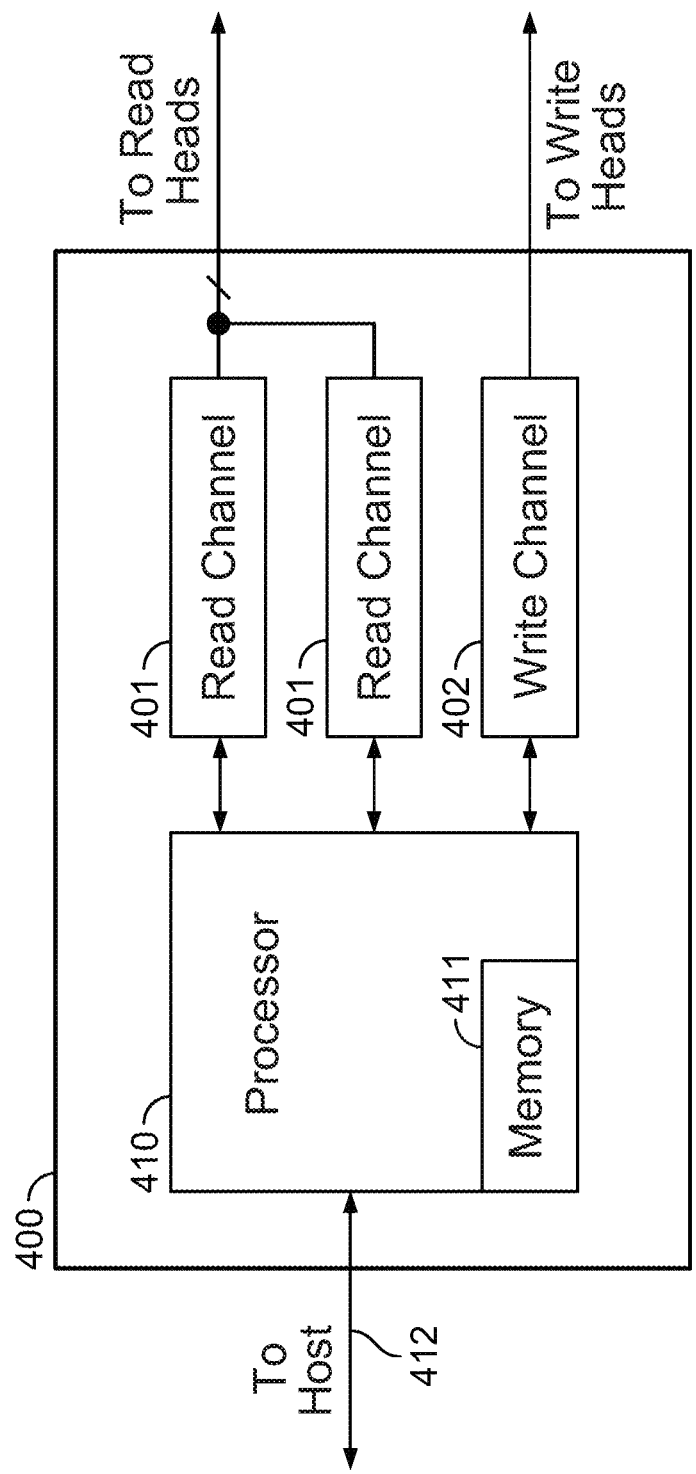
FIG. 4 is a schematic representation of a hard-drive controller which may incorporate the subject matter of this disclosure.

Each of read heads 131, 132 is connected to one of a pair of read channels 401 of a hard drive controller 400 (there is a corresponding write channel 402) (FIG. 4). Hard drive controller 400 also includes a processor 410 and memory 411, as well as a connection 412 to a host processor (not shown). During normal disk operation, memory 411 may be used to store position error sensor (PES) data that indicates track position offsets. A servo control loop in hard drive controller 400 uses the PES data and the servo wedge data to keep the heads 131, 132 on track.

As part of the drive manufacturing process, or later but before first use of the drive, in an implementation, servo data is written to servo wedges 200 on each surface of each platter using, e.g., the self-servo-write process described in commonly-assigned U.S. Pat. No. 8,027,117, which is hereby incorporated by reference herein in its entirety. As noted above, the availability of two RDCs in a drive equipped for TDMR allows the self-servo-write process to be performed on two disk surfaces at the same time, by allowing reading of servo spiral data from both surfaces at the same time, to separately control micro-actuators 202/301/302 to maintain both heads on-track. However, the use of micro-actuators 202/301/302 to maintain both heads on-track may give rise to phase errors in the servo wedges. Implementations of the subject matter of this disclosure may be used to avoid those phase errors by keeping track of, and compensating for, position differences when writing the servo data, as described below.

Figure 5:
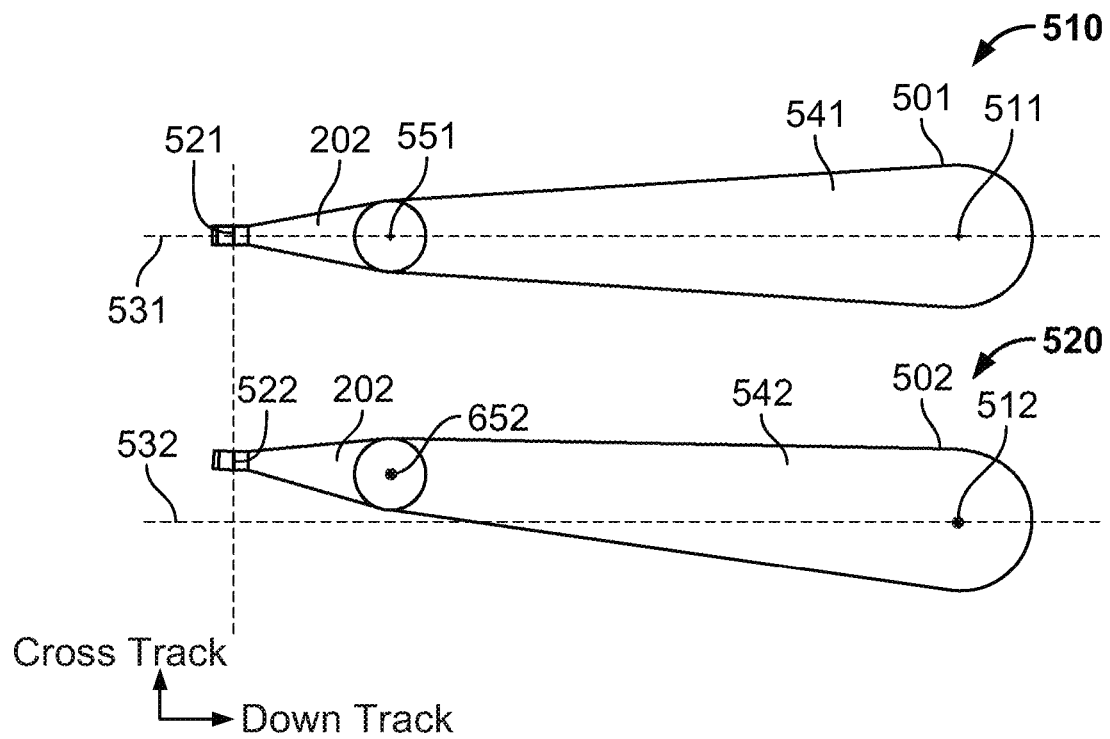
FIG. 5 is a diagram showing how head positions may be controlled using micro-actuators in a storage device which may incorporate the subject matter of this disclosure.

The source of potential phase error is illustrated in FIG. 5, where, as shown at 510, arm 501, having a pivot point 511 about the axis of actuator 121, bears a read head 521 that is on-track over track 531, without having to rotate micro-actuator 202 about axis 551 to a position out of alignment with the main body 541 of arm 501. At the same time, arm 502, having a pivot point 512 about the axis of actuator 121, bears a read head 522 that is off-track relative to track 532 if, as shown at 520, micro-actuator 202 is maintained in alignment with the main body 542 of arm 502.

Figure 6:
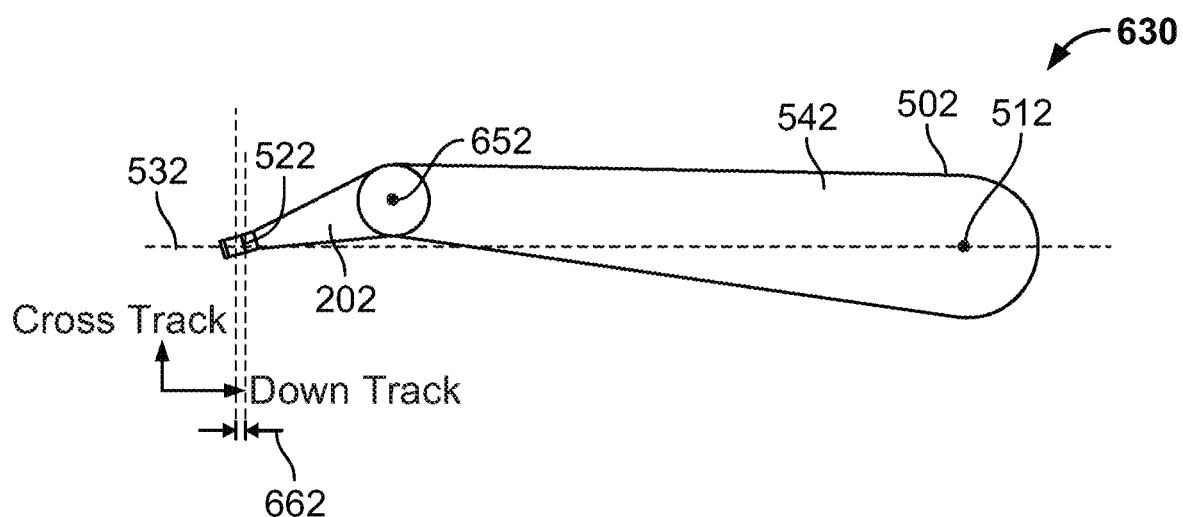
FIG. 6 is a diagram showing how phase error between different heads, which may be corrected according to subject matter of this disclosure, may arise in a storage device.

As shown at 630 in FIG. 6, micro-actuator 202 of arm 502 can be rotated about axis 652 to move head 522 into alignment with track 532. However, while the rotation of micro-actuator 202 about axis 652 provides a cross-track component of motion that moves head 522 into alignment with track 532, that rotation also introduces a down-track component of motion 662. If writing of particular servo wedge data cannot be accomplished in a single pass of head 522, it may happen that before the next pass, and adjustment of micro-actuator 202 may be needed to keep head 522 on-track, and the resulting change in down-track component 662 can give rise to a phase differential between the portions of the servo wedge data written on the two separate passes. For the same reasons, a phase differential between the portions of the servo wedge data written on the two separate passes of head 521 also is possible. Implementations of the subject matter of this disclosure detect and keep a record of any such phase differential so that compensation can be applied when writing servo data to either of tracks 531 and 532.

To recap briefly, the two read channels are used to read servo spiral signals using the two read heads, to control the positions of the two read heads, including using motions of the micro-actuators to control those positions, so that the corresponding write heads can write finer servo wedge data. Micro-actuator motions used to control those positions are kept track of to allow for compensation of the writing process to account for phase differentials between passes. One write channel is sufficient to process the signals for both write heads because the amount of servo wedge data to be written is small, so that both heads can write their separate servo wedge data in one disk revolution.

Figure 7:
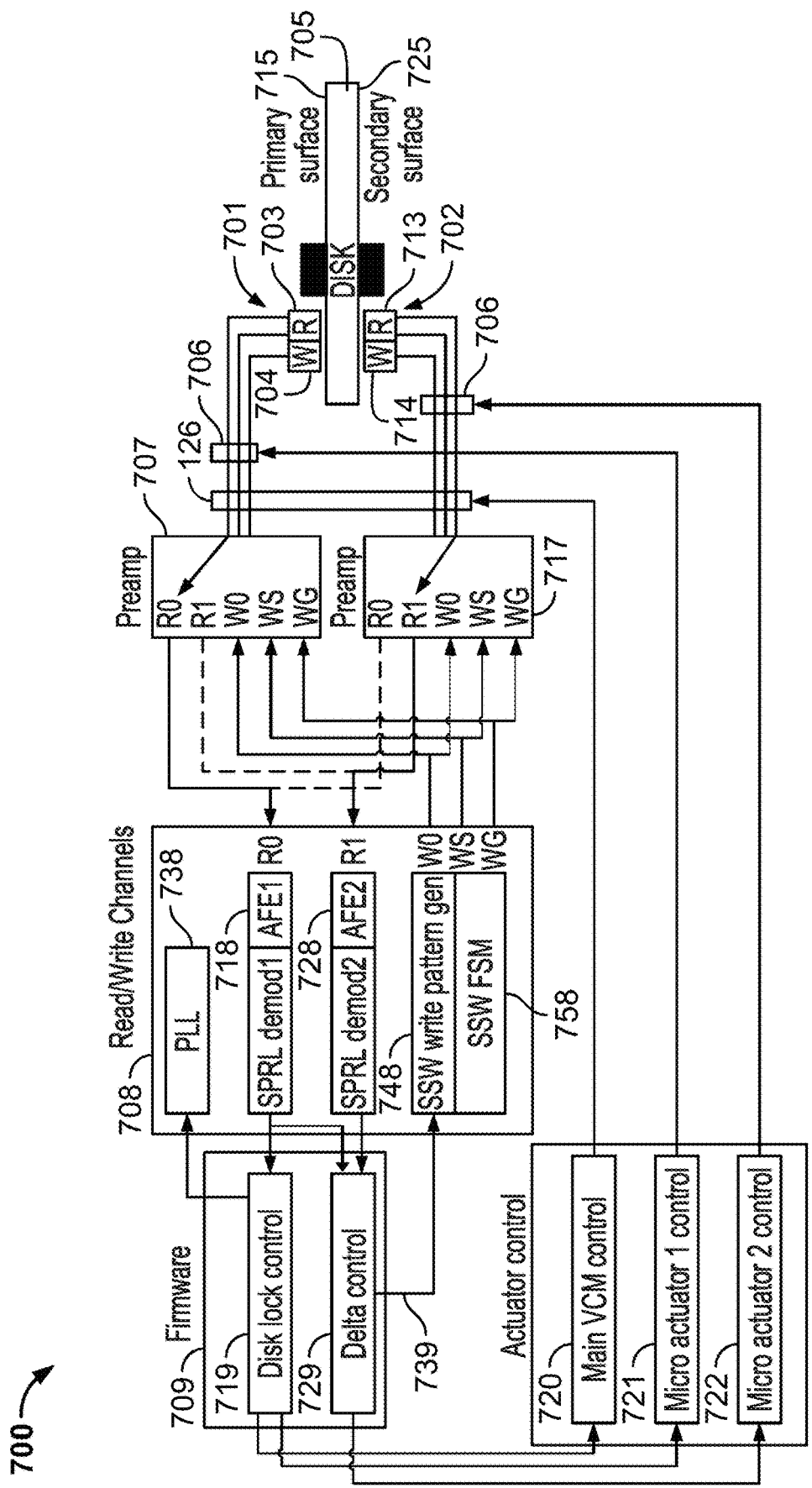
FIG. 7 is a diagram of a storage device control system according to implementations of the subject matter of this disclosure.
Figure 8:
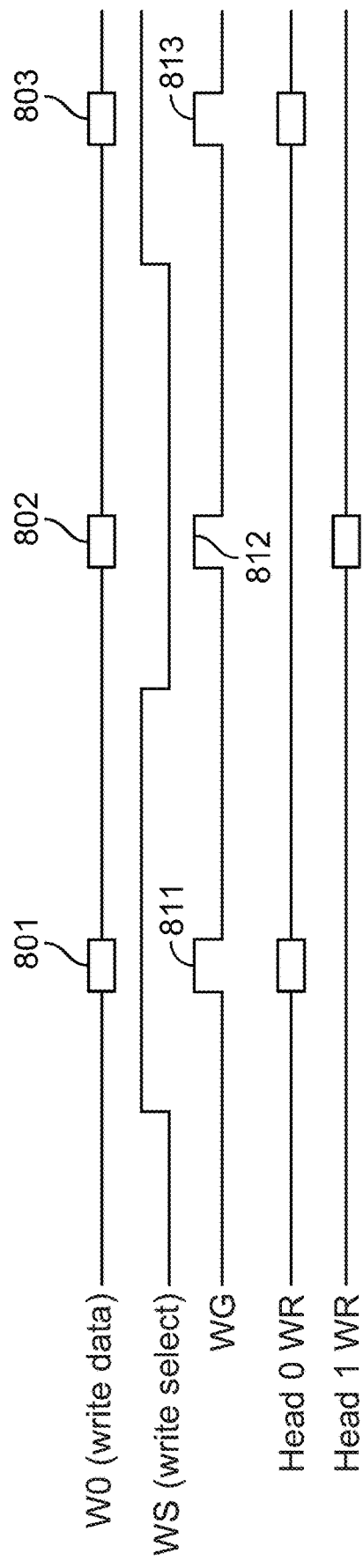
FIG. 8 is a timing diagram showing write signals in accordance with implementations of the subject matter of this disclosure.

FIG. 7 is a diagram of a control system 700 according to implementations of the subject matter of this disclosure. Control system 700 reads servo spiral data from two disk surfaces, keeps track of the down-track component of motion 762, and controls toggling of the write data channel to write to each of the two disk surfaces.

FIG. 7 depicts control system 700 as being coupled to two sets 701, 702 of read and write heads, each including a respective read head 703, 713 and a respective write head 704, 714. As depicted, the two sets 701, 702 of read/write heads serve opposing surfaces 715, 725 of a single disk platter 705. However, that is only an example, and control system 700 can be used to process any two surfaces in a multi-platter disk drive, even on different disk platters.

In addition to processing read and write signals in the manner described below, control system 700 also controls the movement of the read/write heads 701, 702. Specifically, control system 700 controls voice coil motor 126 (shown here schematically) which moves all heads at once as described above, as well as individual micro-actuator control motors 706 (shown here schematically), each respective one of which fine tunes the head positions on a respective single arm by moving a respective individual one of micro-actuators 202 (not shown in FIG. 7) on the respective arm.

As shown in FIG. 7, control system 700 includes a respective preamplifier 707, 717 interfaced with each respective set 701, 702 of read/write heads. Control system 700 may include as many preamplifiers (not shown) as there are sets of read/write heads (i.e., as many preamplifiers as there are disk surfaces) in the disk drive being controlled. Alternatively, because there are only two RDCs in the disk drive, there may be only two preamplifiers 707, 717, shared by all of the sets of read/write heads in the disk drive by using, e.g., multiplexers (not shown) to selectively couple the read/write heads to the preamplifiers.

Each respective preamplifier 707, 717 is capable of directing signals from its respective read head 703, 713 to either one of Read Data Channel 0 (R0) 718 or Read Data Channel 1 (R1) 728 in read/write control unit 708. The disk surface corresponding to one of read heads 703, 713 is designated the "primary" surface. The selection of which of the two disk surfaces is "primary" may be arbitrary. One of the two read channels 718, 728, to which the surface designated as "primary" is coupled, is used to demodulate the spiral signal from the primary surface. The output of the demodulation of the primary surface spiral signal is used to lock the counters (not shown), which are used for timing in the self-servo-write system, to the disk rotation by adjusting a frequency generator in read/write control unit 708 to match the disk rotation frequency. For example, as shown, a phase-locked loop (PLL) 738 may be used as the frequency generator.

Disk lock control 719, which may be implemented, for example, in firmware 709, may use the primary surface spiral signal in a manner similar to the self-servo-write operation described in above-incorporated U.S. Pat. No. 8,027,117, to control the frequency of PLL 738, which can be used to adjust rotational velocity of storage media of the storage device. Disk lock control 719 may also use the primary surface spiral signal to command main voice-coil motor control 720 to keep the radial position of the read head (703 or 713), that is used for the primary surface, aligned with the data track being processed.

The other one of read heads 703, 713—i.e., the read head that is not being used for the primary surface—is used for the secondary surface, and the secondary surface spiral signal from that other one of read head 703, 713 is directed by the respective one of preamplifiers 707, 717 to the other one of read channels 718, 728—i.e., the one that is not coupled to the primary surface spiral signal. In the implementation seen in FIG. 7, the primary surface is coupled by preamplifier 707 to read channel 718, while the secondary surface is coupled by preamplifier 717 to read channel 728.

The output of the demodulation of the secondary surface spiral signal—e.g., the output of read channel 728 in the implementation shown in FIG. 7—is used by "delta control" 729 to command micro-actuator-2 control 722 to keep the secondary surface read head aligned with the track being read. The outputs of both read channels 718, 728 may be used by delta control 729 to determine any phase differential in the primary surface signal between successive passes, and in the secondary surface signal between successive passes.

With regard to head positioning, normally it may be sufficient to keep the micro-actuator of the arm carrying the primary read head (that micro-actuator is controlled by micro-actuator-1 control 721) in a neutral position (i.e., a position aligned with the main body of that arm). However, in some situations it may be necessary to adjust the micro-actuators of both heads, using micro-actuator-1 control 721 and micro-actuator-2 control 722, to maintain both heads over their respective tracks.

As noted above, the output of delta control 729 also is used to determine any phase differential in the primary surface signal between successive passes, and in the secondary surface signal between successive passes. As described in the preceding paragraph, normally the micro-actuator for the head on the primary surface is kept in a neutral position and the micro-actuator is moved only for the head on the secondary surface, meaning that normally a phase differential will occur between passes only for the secondary surface. However, if, as noted in the preceding paragraph, both micro-actuators are moved to keep both heads over their respective tracks, respective phase differentials may occur between passes for both the primary surface and the secondary surface. In any case, the result 739 of the determination of a phase differential by delta control 729 for either surface may be used by self-servo-write pattern generator 748 (in this implementation, part of self-servo-write finite state machine 758) to adjust the self-servo-write pattern for the that surface to account for that phase differential, as described, for example, in commonly-assigned U.S. Pat. No. 10,971,187, which is hereby incorporated by reference herein in its entirety.

As previously mentioned, there is only one write data channel. The self-servo-write data is output as signal W0 to both preamplifiers 707, 717. As seen in the timing diagram of FIG. 8, when data to be written is present on W0 at 801, 802, 803, write-gate signal WG is asserted at 811, 812, 813 to enable writing. When WG is asserted, which one of preamplifiers 701, 717 that will actively write—and therefore which one of the primary surface or the secondary surface will be written to—is determined by write-select signal WS. In the example shown, when WS is high, the first head 703 on the primary surface ("Head 0") is active, while when WS is low, the second head 713 on the secondary surface ("Head 1") is active. As noted above, the two surfaces can share the write channel in this way because the writing time is much shorter than the time needed to move from one servo wedge to the next. Thus, the secondary surface may be written at a later time in the same disk revolution than the primary surface. The timing of the toggling of the WDC to a particular channel also may be used to compensate for the aforementioned phase differential.

Figure 9:
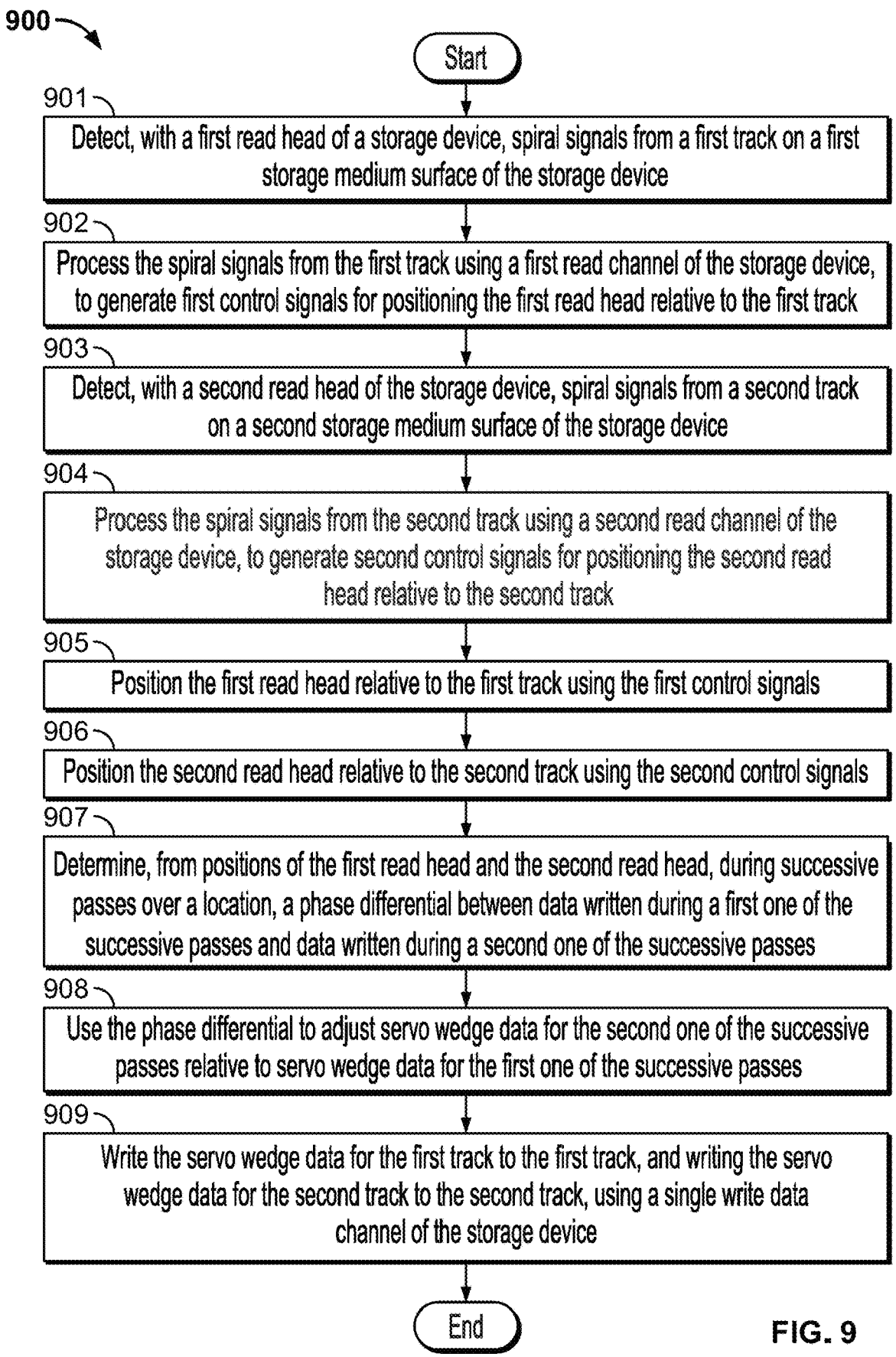
FIG. 9 is a flow diagram illustrating a method according to implementations of the subject matter of this disclosure.

FIG. 9 is a flow diagram illustrating a method 900 according to implementations of this disclosure for performing self-servo-write operations concurrently on two surfaces of a multi-surface storage device.

At 901, self-servo-write spiral signals from a first track on a first storage medium surface of the storage device are detected with a first read head of the storage device. At 902, the self-servo-write spiral signals from the first track are processed using a first read channel of the storage device, to generate first control signals for positioning the first read head relative to the first track. At 904, spiral signals from a second track on a second storage medium surface of the storage device are detected with a second read head of the storage device. At 905, the spiral signals from the second track are processed using a second read channel of the storage device, to generate second control signals for positioning the second read head relative to the second track. At 906, the first read head is positioned relative to the first track using the first control signals. At 907, the second read head is positioned relative to the second track using the second control signals. At 908, a phase differential between first pass of one of the first read head and the second read head, and a second pass of one of the first read head and the second read head is determined from positions of the first read head and the second read head. At 909, the phase differential is used to adjust servo wedge data for the second pass relative to servo wedge data for the first pass. At 910, for the current pass, the servo wedge data for the first track is written to the first track, and the servo wedge data for the second track is written to the second track, using a single write data channel of the storage device, and method 900 ends.

Thus it is seen that a method of performing self-servo-write operations concurrently on two surfaces of a multi-surface storage device, and a multi-surface storage device configured for such a method, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A self-servo-write method in a storage device, the method comprising:
   detecting, with a first read head of the storage device, self-servo-write spiral signals from a first track on a first storage medium surface of the storage device;
   processing the self-servo-write spiral signals from the first track using a first read channel of the storage device, to generate first control signals for positioning the first read head relative to the first track;
   detecting, with a second read head of the storage device, self-servo-write spiral signals from a second track on a second storage medium surface of the storage device;
   processing the self-servo-write spiral signals from the second track using a second read channel of the storage device, to generate second control signals for positioning the second read head relative to the second track;
   positioning a first write head relative to the first track using the first control signals via a single write channel of the storage device;
   positioning a second write head relative to the second track using the second control signals via the single write channel of the storage device; and
   writing servo wedge data for the first track to the first track, and writing servo wedge data for the second track to the second track, using the single write data channel of the storage device, by:
   presenting a write data signal including the servo wedge data for the first track, and the servo wedge data for the second track, to both a write head for the first track and a write head for the second track; and
   toggling a write select signal to write servo wedge data in the write data signal to a correct one of the first track and the second track.

2. The method of claim 1 further comprising:
   determining, from positions of a respective one of the first read head and the second read head during successive passes over a location on a respective one of the first storage medium surface and the second storage medium surface, a phase differential between data written by a respective one of the first write head and the second write head during a first one of the successive passes, and data written by the respective one of the first write head and the second write head during a second one of the successive passes; and
   using the phase differential to adjust servo wedge data for the second one of the successive passes relative to servo wedge data for the first one of the successive passes; wherein:
   writing the servo wedge data in the write data signal to the correct one of the first track and the second track comprises writing the adjusted servo wedge data for the first track to the first track, and writing the adjusted servo wedge data for the second track to the second track.

3. The method of claim 2 further comprising adjusting timing of at least one of the writing of the servo wedge data for the first track to the first track, and the writing of the servo wedge data for the second track to the second track, to compensate for the phase differential.

4. The method of claim 2 wherein the toggling is performed to compensate for the phase differential.

5. The method of claim 1 further comprising processing the self-servo-write spiral signals from the first track to generate frequency control signals to adjust rotational velocity of storage media of the storage device.

6. The method of claim 1 wherein positioning the first read head relative to the first track, and positioning the second read head relative to the second track, comprise rotating a common actuator of a first arm carrying the first read head and a second arm carrying the second read head.

7. The method of claim 6 wherein positioning the first read head relative to the first track, and positioning the second read head relative to the second track, further comprise adjusting a micro-actuator on at least one of the first arm and the second arm.

8. The method of claim 7 wherein adjusting a micro-actuator on at least one of the first arm and the second arm comprises independently adjusting a first micro-actuator on the first arm and a second micro-actuator on the second arm.

9. A storage device, comprising:
a storage medium, having multiple storage medium surfaces, on which servo data is written using a self-servo-write method;
a first read head configured to detect self-servo-write spiral signals from a first track on a first storage medium surface of the storage device;
a first write head corresponding to the first read head, and configured to write self-servo-write data to the first track;
a second read head configured to detect self-servo-write spiral signals from a second track on a second storage medium surface of the storage device;
a second write head corresponding to the second read head, and configured to write self-servo-write data to the second track;
first read data channel circuitry configured to process the self-servo-write spiral signals from the first track, to generate first control signals for positioning the first read head and the first write head relative to the first track;
second read data channel circuitry configured to process the self-servo-write spiral signals from the second track, to generate second control signals for positioning the second read head relative to the second track;
actuator control circuitry that is:
responsive to the first control signals and configured to control positioning of the first write head relative to the first track, and
responsive to the second control signals and configured to control positioning of the second write head relative to the second track; and
a single write data channel configured to write servo wedge data for the first track to the first track, and to write servo wedge data for the second track to the second track, by:
presenting a write data signal including the servo wedge data for the first track, and the servo wedge data for the second track, to both the first write head for the first track and the second write head for the second track; and toggling a write select signal to write servo wedge data in the write data signal to a correct one of the first track and the second track.

10. The storage device of claim 9 further comprising:
channel delta control circuitry configured to determine, from positions of a respective one of the first read head and the second read head during successive passes over a location on a respective one of the first storage medium surface and the second storage medium surface, a phase differential between data written by the respective one of the first read head and the second read head during a first one of the successive passes, and data written by the respective one of the first read head and the second read head during a second one of the successive passes, wherein the actuator control circuitry is configured to use the phase differential to adjust servo wedge data for the second one of the successive passes relative to servo wedge data for the first one of the successive passes.

11. The storage device of claim 10 wherein the single write data channel is further configured to adjust timing of at least one of the writing of the servo wedge data for the first track to the first track, and the writing of the servo wedge data for the second track to the second track, to compensate for the phase differential.

12. The storage device of claim 10 wherein the single write data channel is configured to perform the toggling to compensate for the phase differential.

13. The storage device of claim 9 further comprising disk lock control circuitry configured to process the self-servo-write spiral signals from the first track to generate frequency control signals to adjust rotational velocity of storage media of the storage device.

14. The storage device of claim 9 further comprising a common actuator configured to position a first arm carrying the first read head relative to the first track, and to position a second arm carrying the second read head relative to the second track.

15. The storage device of claim 14 wherein the common actuator is configured to rotate to position the first arm and the second arm.

16. The storage device of claim 14 further comprising a micro-actuator on at least one of the first arm and the second arm for positioning at least one of the first read head relative to the first track, and the second read head relative to the second track.

17. The storage device of claim 16 wherein the micro-actuator on at least one of the first arm and the second arm comprises a first micro-actuator on the first arm and a second micro-actuator on the second arm.

18. The storage device of claim 16 wherein:
one of the first arm and the second arm is adjacent two different storage medium surfaces; and
the one of the first arm and the second arm comprises one micro-actuator carrying a head for one of the two different storage medium surfaces, and another micro-actuator carrying a head for another of the two different storage medium surfaces.

* * * * *